(12) United States Patent
Anderson (10) Patent No.: US 9,946,980 B2
(45) Date of Patent: Apr. 17, 2018

(54) HIGH-FREQUENCY DATA CAPTURE FOR DIAGNOSTICS

(71) Applicant: Jeffery P Anderson, SW Edmonton (CA)

(72) Inventor: Jeffery P Anderson, SW Edmonton (CA)

(73) Assignee: SCHLUMBERGER TECHNOLOGY CORPORATION, Sugarland, TX (US)

( * ) Notice: Subject to any disclaimer, the term of this patent is extended or adjusted under 35 U.S.C. 154(b) by 1453 days.

(21) Appl. No.: 13/645,473

(22) Filed: Oct. 4, 2012

(65) Prior Publication Data

US 2013/0090853 A1  Apr. 11, 2013

Related U.S. Application Data

(60) Provisional application No. 61/544,225, filed on Oct. 6, 2011.

(51) Int. Cl.
| | |
|---|---|
| G06F 19/00 | (2011.01) |
| G01V 9/00 | (2006.01) |
| G06Q 10/06 | (2012.01) |
| H04L 29/08 | (2006.01) |
| G06Q 50/02 | (2012.01) |

(52) U.S. Cl.
CPC .......... *G06Q 10/06* (2013.01); *G06Q 50/02* (2013.01); *H04L 67/04* (2013.01); *H04L 67/2828* (2013.01); *H04L 67/2852* (2013.01); *H04L 67/12* (2013.01)

(58) Field of Classification Search
CPC ................................. G06F 19/00; G06F 17/30
See application file for complete search history.

(56) References Cited

U.S. PATENT DOCUMENTS

| | | | | |
|---|---|---|---|---|
| 4,939,648 | A * | 7/1990 | O'Neill et al. | ................ 702/11 |
| 6,934,256 | B1 * | 8/2005 | Jacobson | ............... H04L 12/26 |
| | | | | 370/235 |
| 2004/0075566 | A1 * | 4/2004 | Stepanik | .............. G08B 21/12 |
| | | | | 340/632 |
| 2007/0097214 | A1 * | 5/2007 | Jung et al. | ................ 348/207.1 |
| 2007/0265809 | A1 | 11/2007 | McDonnell et al. | |

(Continued)

OTHER PUBLICATIONS

Letter Patent for the equivalent Australian patent application No. 2012233018 dated Feb. 6, 2014.

(Continued)

*Primary Examiner* — Paul D Lee
*Assistant Examiner* — Mark Crohn (57) ABSTRACT

High-frequency data capture for diagnostics is provided. An example system collects device data at a high acquisition rate. The collected data can be diagnostic when a critical event occurs, but need not be stored permanently or transmitted to a remote server unless needed. In an implementation, the data is stored in a dynamic circular buffer and the resolution of the data is tapered in real-time to maintain a lean data size of the entire buffer contents. High-resolution is maintained for recent data, while a decreasing resolution is applied to aging data. A triggering event changes the system from transmitting low bandwidth status information to transmitting the entire leaned-down data record stored in the buffer. After the triggering event, the system can also transmit incoming diagnostic data to the remote server at a high data resolution, and then can taper the resolution of the data transmission over time.

18 Claims, 5 Drawing Sheets

(56) References Cited

U.S. PATENT DOCUMENTS

2008/0236837 A1* 10/2008 Lovell et al. ................. 166/336
2012/0007653 A1 1/2012 Choo et al.
2012/0271826 A1 10/2012 Kim

* cited by examiner

HIGH-FREQUENCY DATA CAPTURE FOR DIAGNOSTICS

RELATED APPLICATIONS

This patent application claims the benefit of priority to U.S. Provisional Patent Application No. 61/544,225 to Anderson, filed Oct. 6, 2011 and entitled, "High-frequency Data Capture," which is incorporated herein by reference in its entirety.

BACKGROUND

Industrial control systems monitor the numerous components of industrial plants and large operations, such as oilfields, rigs, refineries, wellsites, mines, waterworks, wastewater plants, wind farms, telecommunications, transportation infrastructure, and the power grid. Supervisory control and data acquisition (SCADA), for example, is a type of industrial control system that relies on far-flung remote units attached to distributed components to communicate with a central server. Such remote telemetry may communicate with the central server over limited bandwidth through multiple links and a central transceiver. The bandwidth for reporting data may be limited by legacy communications protocols, by remoteness (such as isolated devices in a deep well), or by pay-per-volume transmission channels (e.g., by satellite). Often, each remote unit transmits ongoing status information over the limited bandwidth, and may also receive elementary commands from the central server. When a critical event occurs at a remote component, however, such as a fault or failure state, the remote telemetry is limited to providing only sparse data about the critical event suitable for the limited bandwidth available.

SUMMARY

An example process captures sets of site data or device performance parameters at a high rate of repetition, stores the sets in a buffer associated with the device, thins out the sets as the sets age to reduce a data size of the buffer contents while maintaining recent sets, and upon a triggering event, transmits the reduced buffer contents at a limited bandwidth. An example wellsite system includes a processor for executing instructions, a memory coupled to the processor, a network interface for communicating with a remote server, a circular buffer for data storage, and computer readable program code embodied on a non-transitory computer usable medium, the code performing the process of capturing wellsite data at a high acquisition rate, recording the wellsite data in the circular buffer to create stored high-resolution data, transmitting every nth set of the captured wellsite data to provide ongoing status information to the remote server, and when a triggering event occurs, transmitting the stored high-resolution data from the circular buffer to the remote server. This summary section is not intended to give a full description of high-frequency data capture for diagnostics. A detailed description with example embodiments follows.

DETAILED DESCRIPTION

This disclosure describes high-frequency data capture for diagnostics. An example system collects site data, including properties and performance parameters of a given component or system segment, at a high acquisition rate. The system grooms the collected high-resolution data to utilize the limited reporting bandwidth of remote transmission channels, while achieving enhanced diagnostics. The data collected at a high repetition rate may include input/output related to sensors, probes, switches, solenoids, relays, motors, alarms, circuits, and other electrical, electronic, and electromechanical devices and components. The data collected may also include output from other processes, computer programs, or calculations that have already processed sensor input/output to some degree. These data, as captured in a time period leading up to a critical event, can be very important for diagnosing the critical event. The collected data will be variously referred to herein as "data," "information," "inputs-outputs," "properties," and "performance parameters" depending on context, and all these terms are meant to be interchangeable.

In an implementation, the bulk of the collected high-resolution data for diagnosing a critical event is not stored permanently or transmitted to a remote server unless needed after a critical event. Rather, the collected data is stored in a limited data storage medium, such as a dynamic circular buffer, and the resolution of the data is tapered in real-time to maintain a lean data size of the entire buffer contents. High data resolution is maintained for recent data, while a decreasing data resolution is applied to aging data by dropping some data sets. A triggering event changes a remote telemetry unit from transmitting low bandwidth status reports to transmitting the entire leaned-down data record stored in the buffer. After the triggering event, the system may also transmit incoming input/output data at a high data resolution, and then taper the resolution of the data over time elapsed from the critical event.

Example Systems

Figure 1:
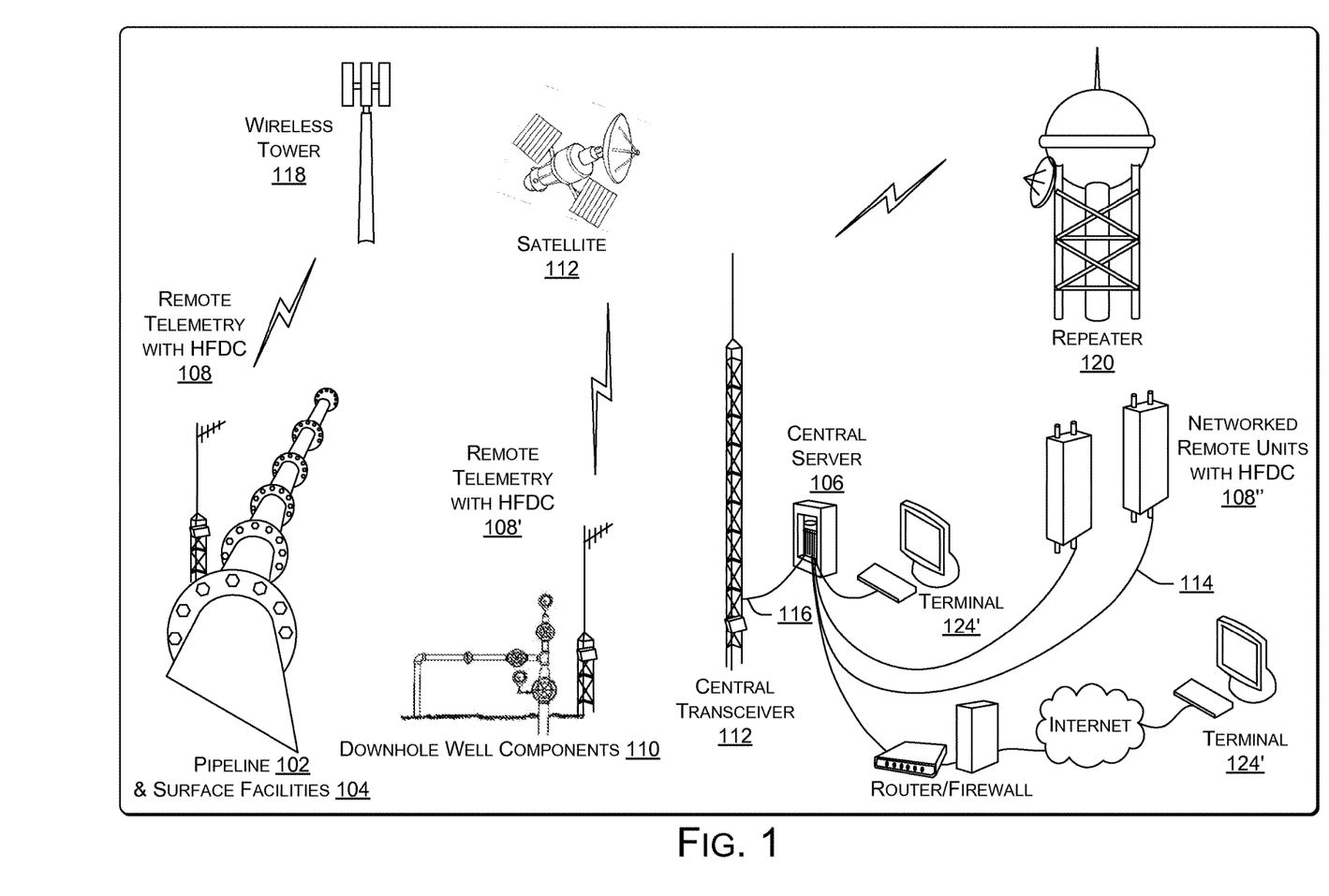
FIG. 1 is a diagram of an example industrial control system using high-frequency data capture (HFDC) to enhance diagnostics.

FIG. 1 shows an example industrial control system using high-frequency data capture (HFDC) processes and engines 108 to enhance diagnostics. Remote devices and system segments may be monitored and controlled by remote terminal units and remote telemetry that is on-site with the isolated component. For example, in an oilfield or wellsite context, the various valves and pressure sensors of a pipeline 102 or surface facility 104 may report to a central server 106 through remote telemetry including HFDC 108. Each well, or each downhole well component 110 may communicate with the larger industrial control system though instances of the remote telemetry including HFDC 108'. A given remote telemetry unit that can perform HFDC 108 may gather information, such as where a leak has occurred, and transmit data collected prior to and after the critical event, including high-resolution historical data leading up to the critical event. The high-resolution data enables enhanced diagnostic analysis and control.

The remote telemetry that includes HFDC 108 may be performed by remote terminal units (RTUs) that connect to sensors and convert sensor signals to digital data before sending the digital data to the supervisory system. The remote telemetry using HFDC 108 may also be performed by a programmable automation controller (PAC) or a programmable logic controller (PLC). A PLC is designed for multiple inputs and output arrangements, extended temperature ranges, immunity to electrical noise, and resistance to vibration and impact. Programs to control machine operation are typically stored in battery-backed-up or non-volatile memory.

Communication within the example industrial control system that uses HFDC 108 can be by data cable 114 (e.g., Ethernet), wire 116, fiber-optic; and for remote and large or regional systems, by radio, such as wireless 118, WLAN, or Wi-Fi, including forwarding units, such as repeaters 120. Communication may utilize controller area network (CAN) hardware and software. The CAN protocol is an ISO standard (ISO 11898) for serial data communication, having widespread use in industrial automation and automotive and mobile machines. Isolated devices may be monitored by remote HFDC telemetry 108' that communicates via satellite 122. User interfaces or "human-machine" interfaces can be computer terminals (124 and 124') and their associated system software. Many industrial control systems rely intentionally or unintentionally on legacy low-bandwidth communication protocols.

Figure 2:
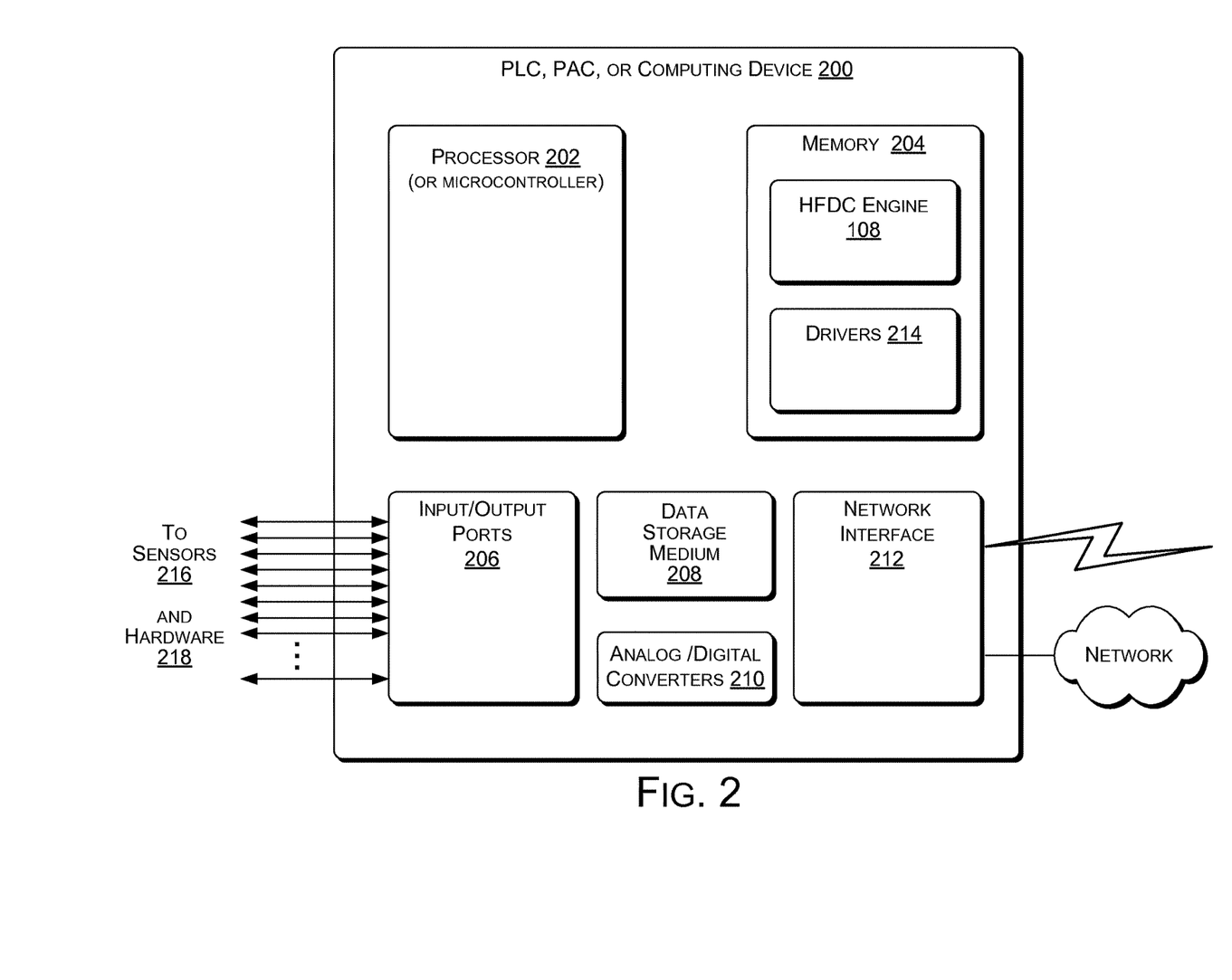
FIG. 2 is a block diagram of an example computing device for executing an example HFDC operation.

FIG. 2 shows elements of an example programmable automation controller (PAC), programmable logic controller (PLC), Remote Terminal Unit (RTU), or generic computer, each represented herein by the term "computing device 200" that can implement example high-frequency data capture (HFDC) and other various techniques described herein. An example PAC can be based on a Technologic Systems 7200 series of embedded computer, the hardware using, for example, Digi's iMX51 System on Module. (Technologic Systems, Inc., Fountain Hills, Ariz.) (Digi International, Inc., Minnetonka, Minn.) The computing device 200 is only one example of a suitable device for implementing the subject matter and is not intended to suggest any limitation as to scope of use or functionality of a hardware environment and/or its possible architectures. Neither should computing device 200 be interpreted as having any dependency or requirement relating to any one or the combination of components illustrated in the example computing device 200.

Computing device 200 may include one or more microcontrollers, processing units, or processors 202, one or more instances of volatile memory 204, one or more input/output (I/O) ports 206 (interfaces, managers), at least one data storage medium 208, such as a First-in-First-out (FIFO) circular buffer, read-only memory, flash memory, or even one or more hard drives; one or more analog-digital converters 210 to convert analog sensor signals to digital data as needed; a network interface 212 or other communications interface, and a bus that enables the various components and devices to communicate with each another. The bus may be one or more of any of several types of bus structures, including a memory bus or memory controller, a peripheral bus, or local bus using any of a variety of bus architectures. The bus can also include wired and/or wireless modalities.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be of numerous available types including "computer data storage media".

Computer data storage media include volatile and non-volatile, removable and non-removable media implemented in any method or technology for storage of information such as computer readable instructions, data structures, program modules, ARM instruction sets, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various software drivers 214 may reside in memory 204 during operation for monitoring sensors 216 and controlling hardware 218. The drivers 214 may also be committed to read-only memory (ROM) as software or firmware, or stored in battery-backed-up RAM 204 or other non-volatile flash memory.

The input/output ports 206 may be connected to sensors, probes, switches, solenoids, relays, motors, alarms, circuits, and other electrical, electronic, and electromechanical devices and components. The input-output ports 206 and/or the network interface 212 may also receive as input, the output of other processes, computer programs, or calculations that have already processed sensor input 216 to some degree.

An example HFDC engine 108 may reside as software instructions or program code in memory 204 during operation. The example HFDC engine 108 may also be committed to read-only memory (ROM) as software or firmware, or stored in battery-backed-up RAM or other non-volatile flash memory.

Example Operations

Some or all of the following processes and operational techniques may be carried out in software, firmware, logic, programming code, ARM instruction sets, and in hardware, or any combination thereof. For example, the following operations may be executed by an example HFDC engine 108.

Examples below may be stated in terms of a particular industry, such as oilfield services. It should be understood that this is done for ease of illustration only, and is not meant to be limiting. The features, systems and/or methods of high-frequency data capture can be broader than any such example, and should be seen as having application in any industry or field in which they can be of use.

Figure 3:
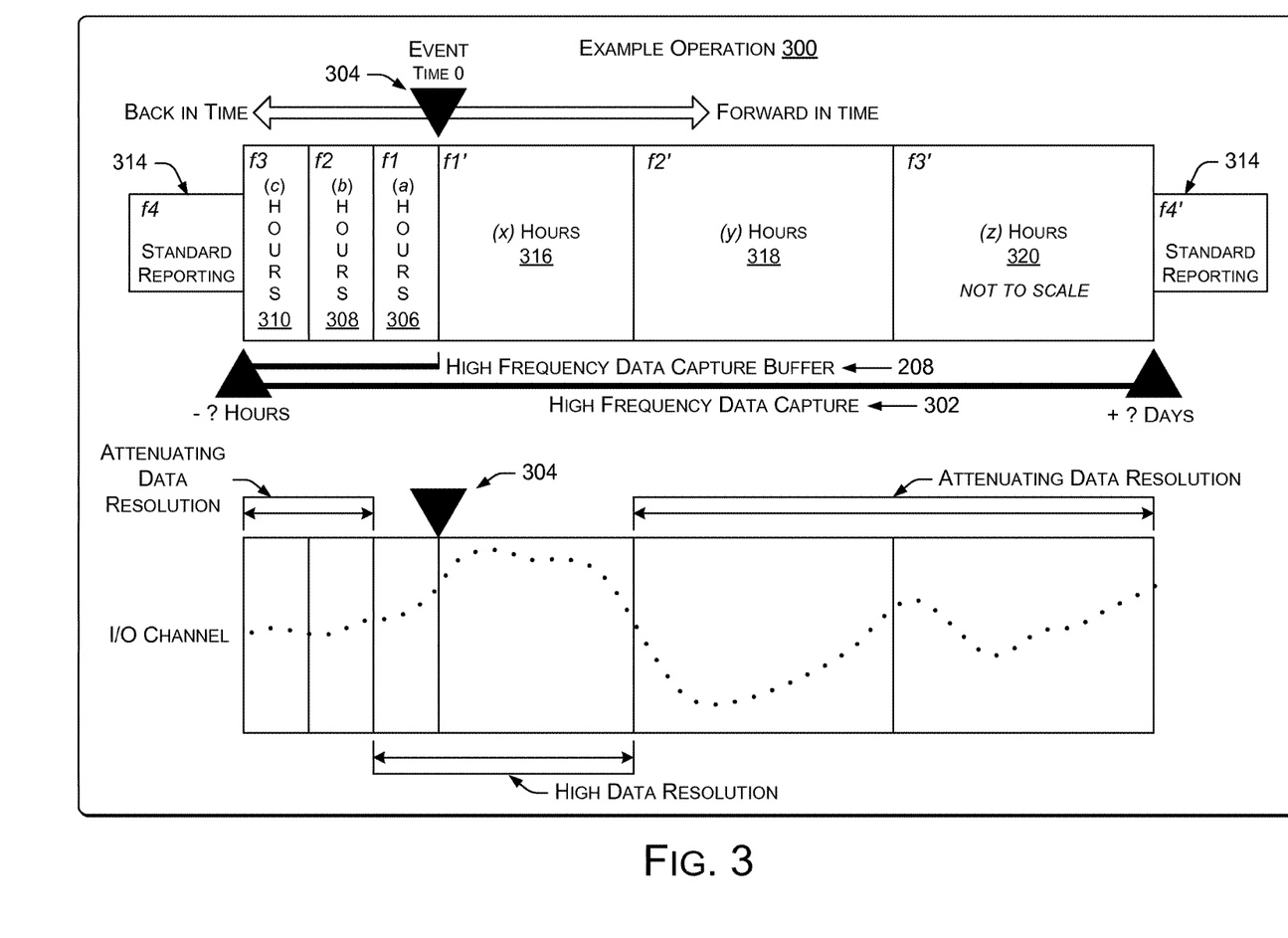
FIG. 3 is a diagram of an example HFDC operation.

FIG. 3 shows an example operation 300 implementing HFDC 108. An ongoing high-frequency data gathering process 302 is ongoing to ensure that pre-event and post-event high-resolution data are available for possible transmission to the central monitoring server 106 when needed or required. By maintaining a continuous (circular) buffer 208 of higher resolution data than is normally used for status reporting, an example computing device 200 can send useful high-resolution historical data when a triggering event 304 occurs, thereby enabling more accurate and valuable diagnostics than would have been possible with standard resolution data. This event-driven HFDC operation 300 facilitates use of transmission media that have comparatively limited or expensive bandwidth, such as satellite communication networks, by transmitting nominally minimal volumes of data without sacrificing the high-resolution data needed prior to and after an important event 304.

In a wellsite implementation, in order to collect data leading up to and following a wellsite "event" 304, including a major event worth detailing with detailed measurement data, a continuous first-in-first-out (FIFO) buffer (e.g., 208)

can record data at a high acquisition frequency that may become useful at some future time. In order to ensure that computational resources are kept to practical limits, the example operation 300 may keep data only in a FIFO manner, so that data will eventually be deleted if not consumed by the system (i.e., reported to a central server 106) before the data is pushed out of the buffer 208 by newer data.

Events 304 can drive the HFDC operation 300 and trigger compilation of historical data in the buffer 208 into a report. Events 304 may also temporarily adjust the reporting frequency for a group of inputs/output data (I/Os).

A triggering event 304, for purposes of the example HFDC operation 300, can be defined by example filters, which are one or more conditional logic states that prevent excessive or nuisance trips. A triggering filter may have the example logical format:

"The input-output (I/O) or alarm ______ is (greater than/less than; equal to/not equal to) ______ (value/state or I/O) for ______ time interval (seconds)."
and such example trigger filter conditions may implemented in an AND/OR/NOR manner.

The example operation 300 records a set of data from an input/output group (I/O group), having a "poll set" identity (PID), into the circular buffer 208 via the I/O ports 206. A poll set, as used herein, is a way of grouping similarly important input/output channels together, for example "Intake Pressure" and "Discharge Pressure" might be in group (PID) 1.

An example data thinning or grooming schema of the example HFDC operation 300 makes use of various data acquisition frequencies and various time intervals (or periods) over which the various data acquisition frequencies are implemented. Once a triggering event 304 has occurred, the example schema may also use accelerated transmission frequencies over associated time periods to send currently collected data at a higher resolution after the triggering event 304, tapering down this higher resolution transmission over time.

In the example circular buffer 208, the recording of I/O data at different acquisition rates over different time periods constitutes a tapering schema that thins out some of the old data sets while maintaining recent data sets at the high data resolution of the high acquisition frequency 302. In an implementation, the actual data acquisition 302 is always at high-frequency, and the implementation of theoretically lower acquisition frequencies for older groups of data sets constitutes a data deletion or overwriting process in the circular buffer 208.

The example operation 300 of FIG. 3 groups recorded data into three (for example) historical time groups, for example:

Time period (a) in hours—(306 in FIG. 3)
Time period (b) in hours—(308 in FIG. 3)
Time period (c) in hours—(310 in FIG. 3)
The time periods may be 2 hours apiece, for example.

Corresponding to the above selected time periods, the example HFDC operation 300 may implement three respective data acquisition frequencies during the three time periods (306, 308, and 310). The three data acquisition frequencies are, for example:

Collection frequency (f1), for time period (a)
Collection frequency (f2), for time period (b)
Collection frequency (f3), for time period (c)
where f1 is a faster data acquisition and recording rate than f2; and f2 is a faster data acquisition and recording rate than f3. A relatively faster or higher frequency data acquisition rate is denoted by a smaller time interval (shorter "wavelength") between acquisitions and thus higher data resolution overall.

For example, f1 may constitute a data set acquisition every 10 seconds; f2 may constitute a data set acquisition every 60 seconds (every minute); and f3 may constitute a data set acquisition every 5 minutes.

These collection frequencies in all three of the example time periods are not necessarily the rate at which data was collected and recorded, because the example HFDC operation 300 may always collects data at a high acquisition frequency 302. Rather, the collection frequencies in time periods 308 and 310 represent sets of the data that have been thinned out, with a pattern of the data sets having been deleted or overwritten to keep the contents of the data buffer 208 lean. The time period closest (most recently in the past) to the triggering event 304 and most temporally relevant to the diagnosis and troubleshooting of a critical event (304) is fully maintained at the highest data resolution available in the buffer 208, reflecting the high acquisition frequency 302 at which the data in this time period 306 was collected and recorded.

As far as recording and maintaining the data in the example circular buffer 208, the example HFDC operation 300 captures sets of input/outputs (e.g., device performance parameters) at a high rate of repetition, stores the sets in a buffer 208 associated with the device or system segment being monitored, thins out the data sets as the sets age in order to reduce the data size of the buffer contents while maintaining recent sets, and upon a triggering event 304, transmits the buffer contents that are now of reduced data size but of high data resolution, at least for the most temporally relevant data, at a limited bandwidth to the central server 106.

When there is no triggering event 304, however, the example HFDC operation 300 periodically transmits a set of the collected device performance parameters (input/output data) to the central server 106 at a low reporting frequency "f4" (standard reporting 314) as an ongoing status report signal over the limited or expensive bandwidth.

Upon occurrence of the triggering event 304, the example HFDC operation 300 may additionally begin to transmit at a high rate of repetition, the sets of device performance parameters currently being captured. But as time goes on from the triggering event 304, the operation 300 attenuates the rate of transmitting in relation to elapsed time.

The proactive transmission of data sets being currently collected may taper off after the critical event 304 according to an example schema that groups future transmission after a critical event 304 into (for example) three future time groups:

Time period (x) in hours—(316 in FIG. 3)
Time period (y) in hours—(318 in FIG. 3)
Time period (z) in hours—(320 in FIG. 3)
Corresponding to the above time periods, the example operation 300 implements three respective decreasing data transmission frequencies during the three time periods (316, 318, and 320). The three example data transmission frequencies are, for example:

Transmission frequency (f1'), for time period (x)
Transmission frequency (f2'), for time period (y)
Transmission frequency (f3'), for time period (z)
where f1' is a higher transmission frequency (smaller interval between transmissions) than the succeeding frequency f2', and f2' is a higher transmission frequency (smaller interval between transmissions) than the succeeding frequency f3'. This provides for decreasing frequency of data set transmission as time elapses from the triggering event 304.

The bottom part of FIG. 3 shows the relative data resolution during different parts of the example HFDC operation 300. The highest resolution data exists, and is transmitted to the central server 106 for the time period 306 immediately prior to a critical event 304 and the time period 316 immediately subsequent to the critical event 304. (Both of these time periods are user selectable.)

In an implementation, a dormancy filter or timer may impose a dormancy period, before the triggering event 304 can be re-triggered.

In an implementation, the example HFDC operation 300 may be activated and deactivated by way of a remote command or by local user command. Similarly, the FIFO and/or circular buffer 208 may also be transmitted to a real-time server 106 "on demand" by way of a remote command or by local user command. Transmitting the FIFO buffer contents result in the receipt at the server 106 of historical data, but higher reporting rates of currently collected data need not become enabled when the buffer 208 is transmitted.

An alarm message can be generated when an HFDC triggering event 304 is started or stopped. The alarm can include the name of the HFDC event 304 and can be treated as a "high" alarm when activated.

Example FIFO Buffer Contents

In an implementation, a programmable automation controller (PAC) is capable of running a configurable-length FIFO buffer 208 that is constantly filling with collected I/O data of varying acquisition frequencies. In the case of an event 304 (e.g., a well trip, start, or failure) high acquisition frequency data recorded prior to the event 304 can be used for performing analyses and failure investigation.

Figure 4:
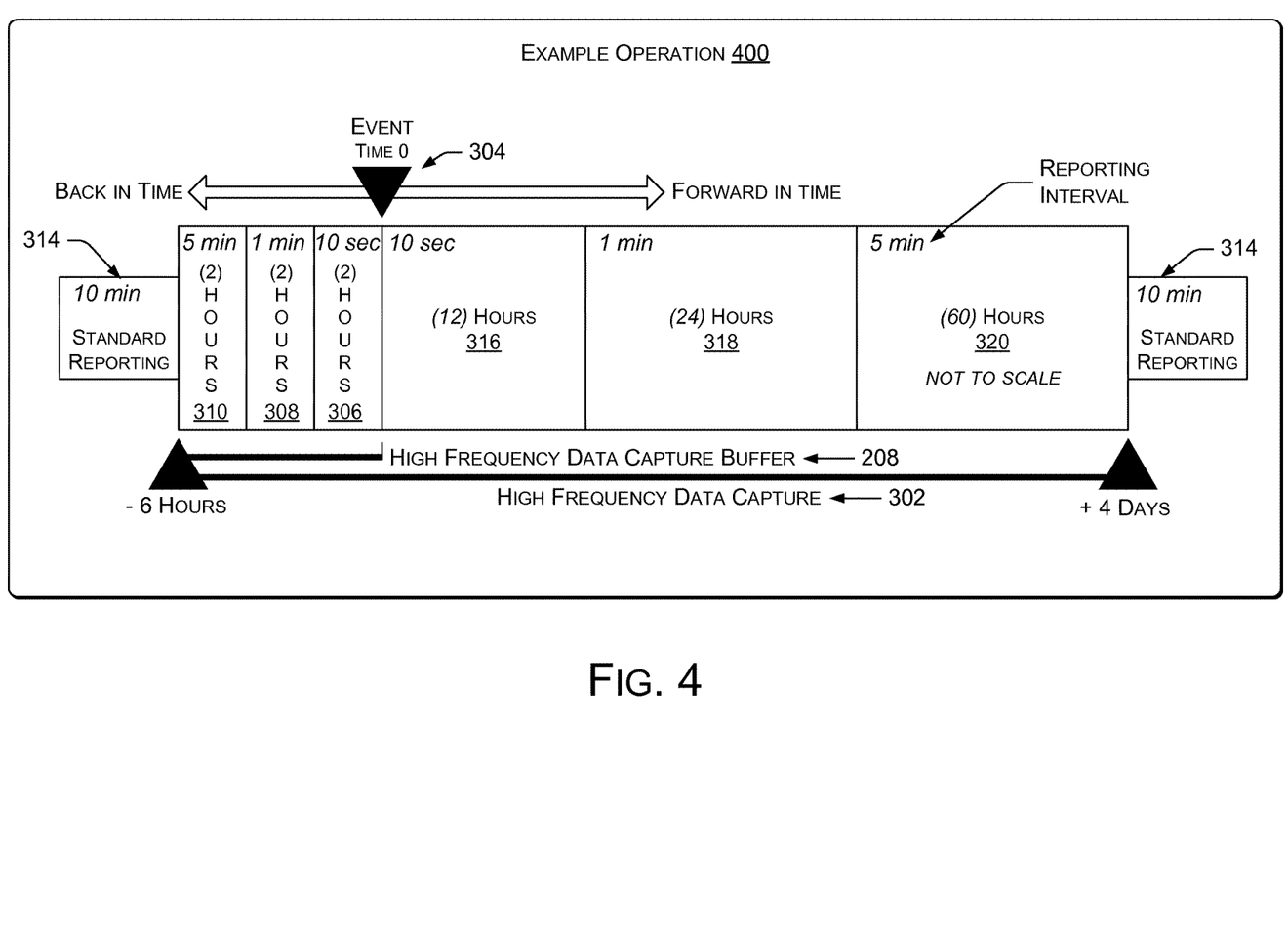
FIG. 4 is a diagram of an example HFDC operation including selected variables.

FIG. 4 shows an example HFDC operation 400, which is similar to the example schema of FIG. 3, but with actual values selected for the variables. The acquisition frequencies in FIG. 3 are represented instead in FIG. 4 by their corresponding reporting intervals (thus, a frequency of "once every 10 seconds" is displayed as "10 seconds"). The high-frequency I/O data acquisitions can thus be stored at each repetition of intervals t1, t2, and t3 for historical time periods (a), (b), and (c) respectively (i.e., time periods 306, 308, and 310).

The time interval t2 can be a multiple of t1, and t3 may be a multiple of t2. Therefore, for an example factor (e.g., a factor of 2), the maximum data included within the buffer 208 for a single I/O can be determined, for example, as:

(amount of data collected at each time interval $t1$)× (duration of time period ($a$))+(0.5×amount of data collected at each time interval $t1$)×(duration of time period ($b$))+(0.25×amount of data collected at acquisition rate $t1$)×(duration of time period ($c$))

Example Trigger Contention

The I/O data sets may be collected at a high acquisition frequency due to the trigger of one or more events 304. In the case of multiple triggering events 304, the greatest duration per window can be applied to/retained to determine the termination date and time of the example HFDC operation 300.

In an illustrative example, a triggering event 304 occurs with the following termination dates and times:
 i. (x): 2011-06-20 12:00:00
 ii. (y): 2011-06-20 13:00:00
 iii. (z): 2011-06-20 19:00:00

Within 30 minutes of the initial triggering event 304, one of the I/O sets can be triggered by and required for another event 304. This event 304 can have duration values of 2 hours, 4 hours, and 20 minutes, for time periods (x), (y), and (z) respectively. This set of I/O data is collected at the higher acquisition frequency as in the following schedule:
 i. Duration 1: 2011-06-20 14:30:00
 ii. Duration 2: 2011-06-20 18:30:00
 iii. Duration 3: 2011-06-20 19:00:00

In this example, Duration 3 remains the same, since the second trigger would have set the time to 18:50:00. Since 19:00:00 is later, this date and time of process termination is retained.

Data Capture and Reporting Scenario

In an example use of the hardware 200 and the HFDC operation 300, an example variable, "Intake Pressure," is set to be monitored via High-frequency Data Capture 108.

A trigger defining an event 304 is set at a value of 1000 psi, and the following HFDC parameters are also set:
 The fastest acquisition frequency f1 is set to once per 10 seconds.
 The secondary frequency f2 is set to once per 20 seconds.
 The tertiary acquisition frequency f3 is set to once per 40 seconds.
 The "a" time period window is set to 2 hours (before the current time of day, i.e., before the event 304 has been detected)
 The "b" time period window is set to 6 hours (prior to the start of the "a" window)
 The "c" time period window is set to 4 hours (prior to the start of the "b" window)
 The "x" time period window is set to 1 hour after a triggering event 304 has been detected
 The "y" time period window is set to 2 hours (after the end of the "x" time window)
 The "z" time period window is set to 4 hours (after the end of the "y" time window)

Based on the defined time period windows of a, b, and c, the example HFDC engine 108 now ensures a buffer 208 is built (by retaining what is needed of the constantly acquired Intake Pressure data) so that the buffer 208 always has at least "every 10 seconds" worth of data for the preceding 2 hours, at least "every 20 seconds" worth of data back 8 hours in time, and at least "every 40 seconds" worth of data back 12 hours in time (2 hours+6 hours+4 hours).

In the scenario, at 6 PM, intake pressure spikes from its nominal value of 800 psi and temporarily reaches 1,100 psi. The example HFDC engine 108 detects this as a triggering event 304 and initiates the event reporting parts of the example HFDC operation 300. The following specific actions are taken:
 The "every 10 seconds" Intake Pressure data from the most recent 2 hours (4 PM to 6 PM) are retrieved from the buffer 208 and sent to the server 106.
 The "every 20 seconds" Intake Pressure data from hours (t−2) to (t−8) (i.e., 10 AM to 4 PM) are retrieved from the buffer 208 and sent to the server 106.
 The "every 40 seconds" Intake Pressure data from hours (t−8) to (t−12) (i.e., 6 AM to 10 AM) are retrieved from the buffer 208 and sent to the server 106.
 The example HFDC engine 108 also begins sending current Intake Pressure data being gathered in real-time to the server with "every 10 seconds" data resolution. This continues until 7 PM.

At 7 PM the example HFDC engine 108 decreases the transmission frequency, and begins sending Intake Pressure data to the server with "every 20 seconds" resolution. This continues until 9 PM.

At 9 PM the example HFDC engine 108 decreases the transmission frequency again, and begins sending Intake Pressure data to the server with "every 40 seconds" resolution. This continues until 1 AM of the following day.

At 1 AM, the HFDC event 304 is considered expired and the example HFDC operation 300 ends. The routine rules for sending Intake Pressure data to the server 106 then resume at the standard reporting frequency 314.

The concepts of high-frequency data capture discussed herein can be used across a wide range of industries, including systems that utilize bandwidth-limited channels, pay-per-volume data services, or that store large quantities of time-series data. The concepts of high-frequency data capture can be used, for example, to enable less frequent transmission of data and/or instructions, without missing critical data leading up to and following events where high-resolution data is needed.

As shown and disclosed, the example HFDC system and operations 300 can be used in SCADA systems utilizing cellular networks, satellite networks or legacy networks; and systems with historians and databases that are used to store time-sensitive data.

Example Method

Figure 5:
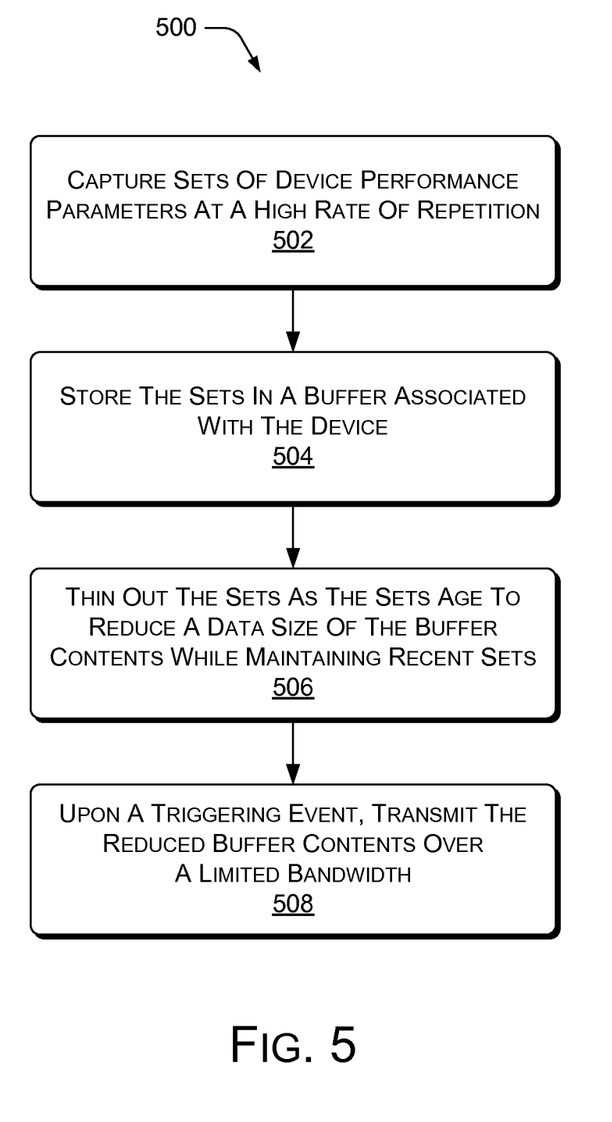
FIG. 5 is a flow diagram of an example method of high-frequency data capture and reporting.

FIG. 5 shows an example method 500 of high-frequency data capture and reporting.

In the flow diagram, operations are shown in individual blocks. The example method 500 may be performed by various hardware components, such as elements of example computing device 200, and HFDC engine 108.

At block 502, sets of device performance parameters are captured at a high rate of repetition.

At block 504, the sets are stored in a buffer associated with the device.

At block 506, the sets are thinned out as the sets age, to reduce a data size of the buffer contents while maintaining a data resolution of recent sets.

At block 508, upon a triggering event, the buffer contents are transmitted over limited bandwidth.

CONCLUSION

Although only a few example embodiments have been described in detail above, those skilled in the art will readily appreciate that many modifications are possible in the example embodiments without materially departing from the subject matter. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. §112, paragraph 6 for any limitations of any of the claims herein, except for those in which the claim expressly uses the words 'means for' together with an associated function.

The invention claimed is:

1. A method, comprising:
capturing sets of device data at a high rate of repetition wherein the sets of device data comprise acquired data pertaining to fluid;
storing the sets in a circular buffer associated with the device;
thinning out the sets as the sets age to reduce a data size of the circular buffer contents while maintaining a high data resolution of recent sets;
upon a triggering event associated with a fluid condition, for diagnosis of the fluid condition, over a transmission channel, at a limited bandwidth, transmitting the circular buffer contents and the sets of device data currently being captured at the high rate of repetition wherein at least a portion of the device data comprises data germane to diagnosis of the fluid condition; and
over the transmission channel, as time elapses from a time that is greater than a time of the triggering event, over a period of time greater than one hour, tapering down a frequency of transmitting at least a portion of sets of device data currently being captured to a predetermined frequency of transmitting.

2. The method of claim 1, further comprising, when there is no triggering event, periodically transmitting a set of the device data at a low repetition rate as an ongoing status signal over the limited bandwidth.

3. The method of claim 1, wherein the capturing comprises inputting a set of well parameters at regular time intervals determined by a collection frequency; wherein the storing comprises recording each set of the well parameters for each time interval in the circular buffer; and wherein the thinning comprises reducing data contents of the circular buffer by deleting sets of the well parameters in a deletion pattern that dynamically maintains a higher data resolution for groups of recent sets and decreases a data resolution for groups of aging sets, the decrease in data resolution in relation to an age of each group.

4. The method of claim 3, further comprising selecting time periods representing the groups of sets to sequentially precede an ongoing current time and to represent the age groups of the recorded sets of well parameters; evenly thinning out sets of the well parameters within each time period representing a group; and thinning out more of the aging sets in older groups to provide sets of well parameters representing a decreased collection frequency for older data.

5. The method of claim 4, further comprising, when the triggering event occurs, transmitting the sets of the well parameters currently being collected at the collection frequency to the remote receiver; selecting a sequence of time periods succeeding the triggering event; and tapering down the frequency of the transmissions of the sets in stepped reductions of the frequency corresponding to the time periods.

6. The method of claim 5, wherein the stepped reductions of frequency represent multiples of the time intervals established by the collection frequency.

7. A system, comprising: a processor for executing instructions; a memory coupled to the processor; a transmitter, port, or network interface for communicating with a remote server; at least a circular buffer for data storage; computer readable program code embodied on a non-transitory computer usable medium, the computer program code performing: capturing wellsite data at a high acquisition rate, including acquiring one set of wellsite data for each time interval established by a collection frequency; recording the wellsite data in the circular buffer to create stored high-resolution data; transmitting every nth set of the captured wellsite data to provide status information of reduced data size to the remote server; when a triggering event occurs associated with a wellsite condition, for diagnosis of the wellsite condition, transmitting the stored high-resolution data from the circular buffer to the remote server at a higher data rate and transmitting the sets of the wellsite data being captured to the remote server at the collection frequency wherein at least a portion of the data being transmitted comprises data germane to diagnosis of the wellsite condition; and tapering a frequency of the transmissions over a passage of time greater than one hour from the triggering event.

8. The system of claim 7, wherein at least the processor, the memory, and the circular buffer comprise an embedded system suitable for a well environment.

9. The system of claim 7, further comprising program code for reducing a data size of the contents of the circular buffer for efficient transmission of the contents to the remote server; wherein reducing the data size includes deleting sets of the wellsite data from the circular buffer; and wherein the deleting tapers a data resolution of the stored wellsite data from a highest data resolution for newest wellsite data to a lowest data resolution for oldest wellsite data.

10. The system of claim 9, further comprising program code for: determining time periods sequentially preceding an ongoing current time of day; while deleting sets of the stored wellsite data, deleting every nth set of the wellsite data within each time period; and retaining more sets of the wellsite data for recent time periods and retaining fewer sets of the wellsite data for older time periods.

11. The system of claim 7, wherein the wellsite data includes values for wellsite properties and wellsite performance parameters.

12. The system of claim 7, wherein transmission to the remote server has an associated expense for use of a bandwidth, a data transfer rate, or a size of data transferred.

13. The system of claim 7, further comprising a filter for disregarding wellsite events that do not meet a trigger threshold.

14. The system of claim 7, further comprising program code for selecting a sequence of time periods succeeding a triggering event; and program code for reducing the frequency of the transmissions in reduction steps corresponding to the time periods.

15. A method, comprising:
receiving wellsite data;
at a standard transmission frequency, periodically transmitting at least a portion of the received wellsite data to a remote receiver;
recording the received wellsite data in a circular buffer at a high data acquisition rate to create stored wellsite data at a high data resolution;
dynamically reducing a data size of the stored wellsite data in the circular buffer in real-time by tapering a data resolution of the stored wellsite data from a highest data resolution for newest data to a lowest data resolution for oldest data;
upon a triggering event associated with a wellsite condition, for diagnosis of the wellsite condition, transmitting the stored wellsite data in the circular buffer to the remote receiver and receiving additional wellsite data and transmitting at a real-time transmission frequency the additional wellsite data to the remote receiver wherein the real-time transmission frequency exceeds the standard transmission frequency and wherein at least a portion of the data being transmitted comprises data germane to diagnosis of the wellsite condition; and
in relation to a passage of time from the triggering event, receiving yet additional wellsite data and periodically transmitting the yet additional wellsite data at a successively lesser transmission frequency over a period of time greater than one hour to return to the standard transmission frequency.

16. The method of claim 15, wherein the recording includes storing sets of the wellsite data, one set of the wellsite data stored for every time interval determined by a given collection frequency.

17. The method of claim 16, further comprising: transmitting every nth set of the wellsite data as status information of reduced data size to the remote receiver; and when a triggering event occurs, transmitting the entire contents of the circular buffer to the remote receiver.

18. The method of claim 15, wherein dynamically reducing the data size of the stored wellsite data in the circular buffer in real-time includes thinning out the sets in real-time according to a deletion schema; wherein the deletion schema retains sets of the wellsite data collected at n seconds apart, wherein the n dynamically increases as the sets of the wellsite data become older.

* * * * *